(12) United States Patent
Gentry (10) Patent No.: US 9,747,901 B1
(45) Date of Patent: Aug. 29, 2017

(54) SPEECH INTERACTION FOR UNMANNED AERIAL VEHICLES

(71) Applicant: Amazon Technologies, Inc., Seattle, WA (US)

(72) Inventor: Nicholas Kristofer Gentry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 14/634,578

(22) Filed: Feb. 27, 2015

(51) Int. Cl.
*G10L 15/22* (2006.01)
*G06F 3/16* (2006.01)
*B64C 39/02* (2006.01)

(52) U.S. Cl.
CPC ............ *G10L 15/22* (2013.01); *B64C 39/024* (2013.01); *G06F 3/167* (2013.01); *B64C 2201/128* (2013.01); *B64C 2201/141* (2013.01)

(58) Field of Classification Search
CPC . G01L 15/22; G01L 15/18; G06F 3/16; G06F 3/167; B64C 29/00; B64C 29/02; B64C 27/00; B64C 27/02; B64C 27/04; B64C 27/20; B64C 27/22; B64C 27/027; B64C 27/028; B64C 27/088; B64C 27/128; B64C 27/141; B64C 27/146
See application file for complete search history.

(56) References Cited

U.S. PATENT DOCUMENTS

| | | | | |
|---|---|---|---|---|
| 5,371,581 | A * | 12/1994 | Wangler | G01S 7/51 340/946 |
| 6,584,376 | B1 * | 6/2003 | Van Kommer | G05D 1/0285 379/88.03 |
| 9,321,531 | B1 * | 4/2016 | Takayama | B64D 1/12 |
| 9,495,957 | B2 * | 11/2016 | Weider | G06F 17/30864 |
| 2005/0143999 | A1 * | 6/2005 | Ichimura | G10L 15/26 704/251 |
| 2010/0096490 | A1 * | 4/2010 | Gordon | B64C 27/10 244/2 |
| 2015/0120094 | A1 * | 4/2015 | Kimchi | B64C 39/024 701/3 |

(Continued)

OTHER PUBLICATIONS

Rouse, "SearchContentManagement.com, natural language processing (NLP)," May 20, 2011, TechTarget, http://searchcontentmanagement.techtarget.com/definition/natural-language-processing-NLP, accessed Oct. 29, 2016.*

(Continued)

*Primary Examiner* — Thomas G Black
*Assistant Examiner* — Sara Lewandroski
(74) *Attorney, Agent, or Firm* — Lee & Hayes, PLLC (57) ABSTRACT

An unmanned aerial vehicle (UAV) may be used for delivering products or other articles. The UAV is configured to detect the presence of nearby people, animals, or other interactive objects. Upon detecting a nearby object, the UAV may produce speech in order to warn or instruct the object. The UAV may also have speech input capabilities in order to capture and respond to speech from the object. The UAV may conduct a speech dialog with a nearby person in order to request information and/or answer questions from the object. In certain situations, the UAV may detect whether an object is in the way of a desired landing area and may communicate with the object through speech to ask the object to move or to ask the object to specify an alternative landing area.

20 Claims, 7 Drawing Sheets (56) References Cited

U.S. PATENT DOCUMENTS

| | | | |
|---|---|---|---|
| 2015/0158587 A1* | 6/2015 | Patrick | B64C 39/024 244/137.4 |
| 2015/0183528 A1* | 7/2015 | Walsh | B64F 1/32 701/3 |
| 2015/0344136 A1* | 12/2015 | Dahlstrom | B64C 39/024 701/3 |
| 2016/0033966 A1* | 2/2016 | Farris | G01C 21/00 701/15 |
| 2016/0039529 A1* | 2/2016 | Buchmueller | B64D 31/06 244/65 |
| 2016/0068264 A1* | 3/2016 | Ganesh | G08G 5/0069 701/2 |
| 2016/0068267 A1* | 3/2016 | Liu | B64C 39/024 701/11 |
| 2016/0083073 A1* | 3/2016 | Beckman | G09F 9/33 40/463 |
| 2016/0117853 A1* | 4/2016 | Zhong | B64C 39/024 345/634 |
| 2016/0139596 A1* | 5/2016 | Na | B64C 39/024 701/2 |
| 2016/0140496 A1* | 5/2016 | Simms | G06Q 10/0835 705/337 |
| 2016/0189101 A1* | 6/2016 | Kantor | G08G 5/0013 705/338 |
| 2016/0209839 A1* | 7/2016 | Hoareau | G05D 1/0027 |
| 2016/0229534 A1* | 8/2016 | Hutson | B64C 27/08 |
| 2016/0239803 A1* | 8/2016 | Borley | G06Q 10/0833 |
| 2016/0272310 A1* | 9/2016 | Chan | B64C 27/08 |

OTHER PUBLICATIONS

Kushleyev et al., "Planning for Landing Site Selection in the Aerial Supply Delivery," 2011, IEEE.*

* cited by examiner

SPEECH INTERACTION FOR UNMANNED AERIAL VEHICLES

BACKGROUND

Automated aerial vehicles, sometimes referred to as drones or unmanned aerial vehicles (UAVs), have become commonly used by hobbyists, some commercial entities, and various militaries. In some cases, UAVs may be used for delivering products. Despite offering numerous applications, however, UAVs present various challenges with respect to their potential contact with people as the UAVs are at or in route to delivery destinations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed to unmanned aerial vehicles (UAV) and systems, devices, and techniques for communicating with persons that may be in the vicinity of such UAVs. In an example system, a UAV is used to deliver products to the homes or other premises of customers. The UAV may start from a distribution point such as a warehouse and may fly to a delivery destination. At the delivery destination, the UAV may navigate to a drop site, descend or land at the drop site, and release the product. The UAV may then ascend and return to the distribution point.

At some point during its trip, the UAV may encounter an interactive object (e.g., a person, animal, etc.). As used herein, the term "interactive object" may include any person, animal (e.g., dog, cat, bird, squirrel, etc.) or robotic device (e.g., a self-driving car, an automated mobility device, etc.) that may be responsive to audio or visual commands from a UAV. In one example, a person may be at or near the delivery destination. As another example, a person may approach a UAV that is broken or malfunctioning and that is resting on the ground.

When near an object, the UAV may be configured to interact with the object through speech. That is, the UAV may speak to the object, may recognize responsive speech or action by the object, and may respond with further speech.

The UAV may have one or more sensors that recognize the presence of a nearby object. For example, the UAV may have a camera that produces images of the area surrounding the UAV and may analyze the images to detect people or other objects within the images. As another example, the UAV may use infrared sensing to detect nearby people. As another example, the UAV may detect human speech in an audio signal in order to determine that a person is nearby.

The UAV may have a loudspeaker for producing audio output, which may include speech. When the UAV is disabled and grounded, the loudspeaker may be used to generate a spoken warning such as "Please stay away." In some cases the UAV may be configured to instruct or request a nearby person to report the location and/or condition of the disabled UAV such as by instructing the person to call a designated phone number. The reporting person may be offered a reward for this. As another example, the UAV may be configured to request a person to move away from an intended landing area prior to descent of the UAV.

The UAV may also have a microphone for capturing speech of a nearby person. The UAV may have or may be supported by an automatic speech recognition service to recognize the person's speech. The UAV may in some cases be configured to conduct a two-directional speech dialog with a nearby person. This capability may be used to obtain information about the person and/or to obtain instructions from the person regarding delivery of a product. As an example, the UAV may ask a person to identify themselves prior to releasing the product at the delivery destination. As another example, the person may ask the UAV to postpone delivery. In another example, the UAV may interact with the person by speech to negotiate an appropriate or desired landing area for the UAV.

The UAV may itself have automatic speech recognition (ASR) and natural language understanding (NLU) capabilities that are used to understand the speech of a person. Alternatively, the UAV may produce an audio signal containing the speech of the person and may transmit the audio signal to a remote support service where ASR and NLU are performed. Similarly, either the UAV or an associated support service may have logic for generating speech to be produced on the loudspeaker of the UAV in response to recognized and understood speech of a person. The speech recognition, understanding, and generation capabilities may be used to conduct speech dialogs with the person in order to solicit and refine specific information sought from the person.

In some embodiments, audio may be provided from the UAV to a live customer support representative. The support representative may respond by speech to the person near the UAV and may conduct a two-way live speech dialog with the person. In some embodiments, the UAV may have two-way video capabilities so that the support person and the nearby person may communicate by both voice and video.

Figure 1:
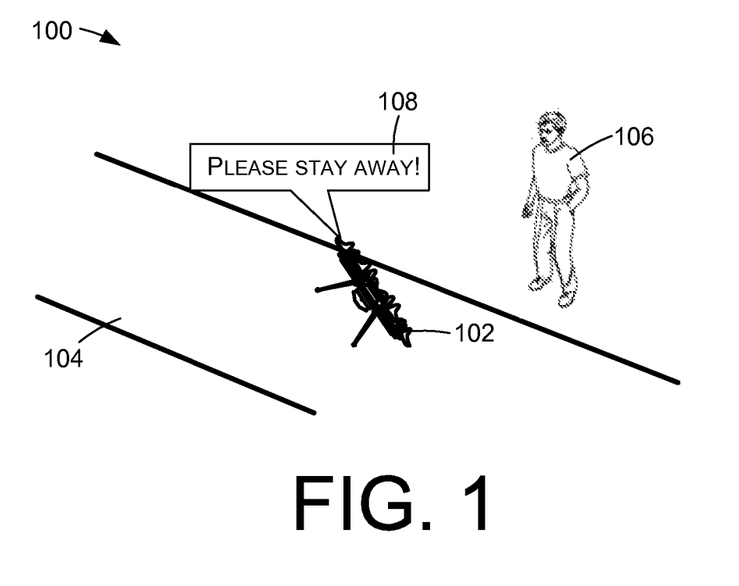
FIGS. 1 and 2 are pictorial representations of scenarios in which an unmanned aerial vehicle (UAV) may communicate with a nearby person using speech.

FIG. 1 shows an example scenario 100 in which a UAV 102 has become disabled and is resting on a street 104 near an on-scene person 106. The UAV 102 may have become disabled by losing power, by colliding with something, by becoming tangled in or by something, by becoming lost, by losing one or more essential functions, etc. In some cases, the UAV 102 may be in a potentially hazardous state, such as in a state where one or more propellers are powered and turning. In some cases the state of the UAV 102 may be unknown and the UAV 102 is assumed to be in a hazardous state.

In the example of FIG. 1, the UAV 102 has speech output capabilities. After detecting that the interactive object, in this case a person 106 is nearby, such as within a threshold distance of the UAV 102, the UAV 102 issues an audible speech statement 108, which in the illustrated example comprises the phrase "Please stay away." Other statements may be issued depending on conditions and objectives. For example, the UAV 102 may request that the person 106 move the UAV 102 off the street 104. As another example, the UAV 102 may request that the person 106 call a stated telephone number and report the location and condition of the UAV 102. As another example, the UAV 102 may request that the person perform some type of service on the UAV 102 such as moving the UAV 102 to a power replenishment location or plugging the UAV 102 into a charging station. In some embodiments, the person 106 may be asked to deliver the UAV 102 back to its base location.

The particular speech produced by the UAV 102 may be determined based various conditions that the UAV 102 is able to sense or determine. For example, the UAV 102 may be able to sense the presence of the person 106. As another example, the UAV 102 may be able to determine that certain of its capabilities are broken or malfunctioning. As another example, the UAV 102 may be able to determine its location but may not be able to communicate its location to its home base.

Figure 2:
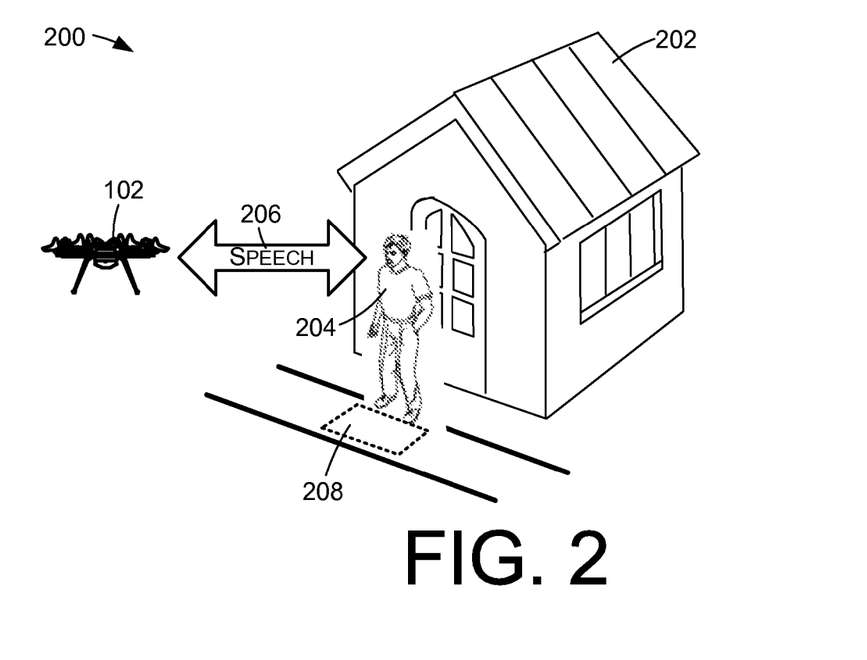

FIG. 2 shows another example scenario 200 in which the UAV 102 is approaching the residence 202 of a person 204 for delivery of a product or other article. In this example, the UAV 102 has speech input and speech output capabilities, allowing bidirectional speech 206 between the UAV 102 and the person 204.

Before landing, in response to detecting the presence of the person 204 near a proposed drop site 208, the UAV 102 may produce speech announcing its intention to land at the drop site 208 and requesting the person 204 to move away from the drop site 208. The UAV 102 may hover nearby until the person 204 moves a sufficient distance from the drop site 208 or may postpone delivery if the person 204 does not move away from the drop site 208. After landing and delivering an article, the UAV 102 may similarly produce speech that warns any nearby person to a potentially hazardous condition as the UAV 102 starts up and takes off.

In addition to providing warnings and requests, either the UAV 102 or the person 204 may initiate a two-directional speech dialog. For example, the UAV 102 may ask a question of the person 204. When the person 204 responds, the UAV may capture the speech response of the person and analyze the speech response to determine its meaning. The UAV 102 may initiate additional dialog turns to solicit further information or more detailed information from the user.

Alternatively, the person 204 may ask a question of the UAV 102. The UAV 102 may capture the person's speech and analyze the speech to determine the nature of the question. The UAV 102 may then provide an answer to the person's question.

Generally, the UAV 102 may implement two-directional speech dialogs to implement any number of usage scenarios, which may include but are not limited to the following:
the UAV 102 may thank the person 204 for their business;
the UAV 102 may ask the person 204 to identify themselves and the person 204 may respond with their name or other identification;
the UAV 102 may ask the person 204 to confirm delivery of the article and may record audio and/or video that includes the person's spoken confirmation;
the UAV 102 may warn nearby persons when landing or taking off;
the UAV 102 may ask the person 204 where to deliver the article, and the person 204 may indicate a preferred drop site;
the person 204 may indicate a preferred delivery schedule or time;
the UAV 102 may ask the person 204 to comment on the delivery and may record the person's response or relay the response to a customer service center;
the person 204 may ask a customer service question such as "When is my next package coming" or "Please deliver another time," and the UAV 102 may respond with the requested information;
the person 204 may inquire about other orders and the UAV 102 may respond with information regarding other orders; or the person 204 may ask to speak to a live representative and may be connected by audio and/or video to a live customer service representative.

Figure 3:
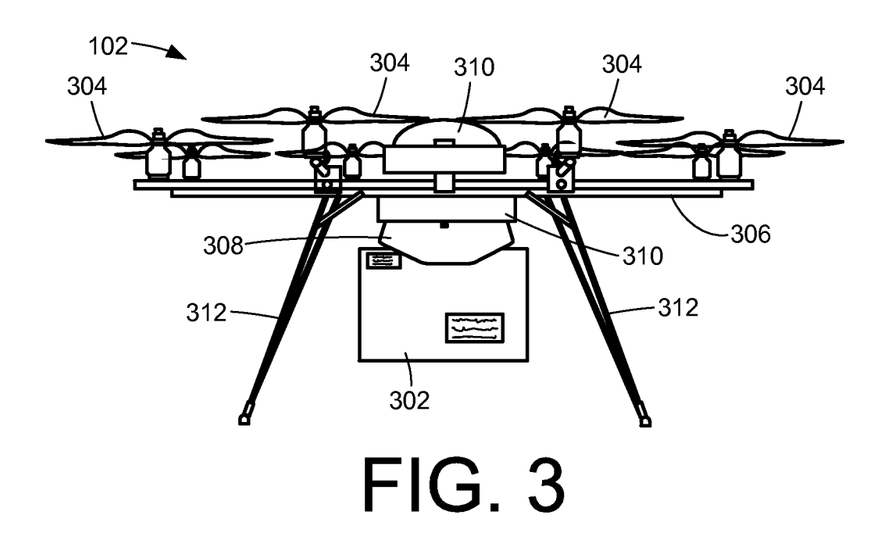
FIG. 3 is a side view of an example UAV.

FIG. 3 shows an example implementation of the UAV 102 that may be used for delivering a product or other article 302 from a distribution point to a delivery destination. In this example, the UAV 102 has multiple propellers 304 attached to a frame or chassis 306 to provide propulsion for vertical takeoff, vertical landing, horizontal flight, and hovering. The multiple propellers 304 may be individually powered and controlled to produce controllable movement of the UAV 102 in any direction or to cause the UAV 102 to hover in a stationary position.

In various embodiments, the UAV 102 may comprise a quadcopter, octocopter, or other multi-rotor aerial vehicle. In some embodiments, the UAV 102 may include at least one fixed wing to provide at least some upward lift during horizontal flight of the UAV 102. In some embodiments, the UAV 102 may be configured to transition from rotor flight to a fixed-wing flight during operation, such as by redirecting rotors/propellers from a lift configuration to a forward propulsion configuration when the UAV 102 includes at least one wing that provides upward lift.

The UAV 102 may have an article support 308 that is configured to grasp, support, and carry the article 302 during flight of the UAV 102 to a delivery destination. The article support 308 may be electronically controlled so that the article 302 can be released at its intended destination. In other embodiments, the UAV 102 may have a cargo compartment or other means of supporting or carrying the article 302.

The UAV 102 may have one or more housings, enclosures, or attachments 310 that contain and/or support various sensors and control logic. Generally, sensors and control logic may be attached at any appropriate location on the chassis 306.

The chassis 306 includes multiple legs 312 that support the UAV 102 when it is on the ground.

Figure 4:
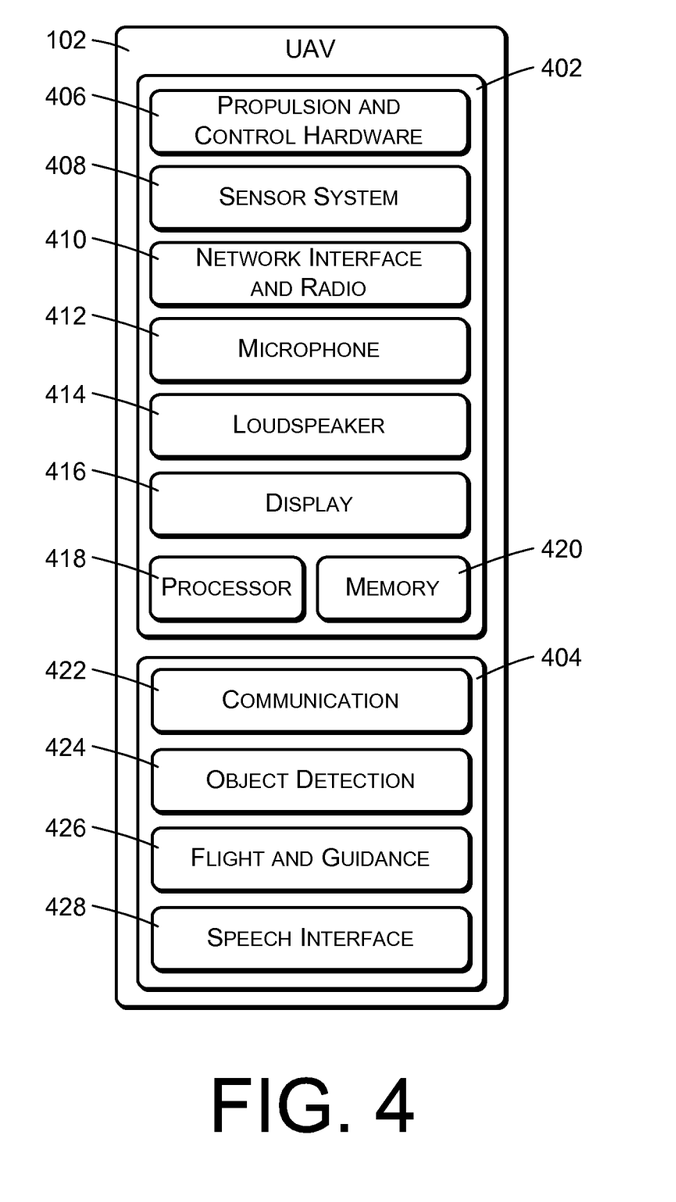
FIG. 4 is a block diagram showing relevant components of an example UAV.

FIG. 4 illustrates relevant components of the UAV 102 in block form. The components include physical hardware components 402 and control logic components 404. The physical hardware components 402 include propulsion and control hardware 406. The propulsion and control hardware 406 may include the propellers 304 and associated motors (not shown) that are used to power the propellers 304. The propulsion and control hardware 406 may also include various control systems and mechanisms (not shown) including actuators, electrical circuits, power control systems, drivers, power sources such as batteries, and so forth.

The physical hardware components 402 also include a sensor system 408, which may include various types of sensors such as visual cameras, infrared (IR) cameras, depth sensors, three-dimensional cameras, proximity sensors, radar systems, global positioning satellite (GPS) components, audio sensors, altimeters, accelerometers, thermometers, gyroscopes, range-finding mechanisms, laser rangefinders, pulse radar components, ultrasonic ranging components, and others. The sensors may be mounted with respect to the chassis 306 in positions that are appropriate to their functions. Cameras, for example, may be mounted so as to have clear views of surroundings.

The UAV 102 may have one or more wireless network interfaces and/or radios 410 that are used for communicating with a control center and/or with other UAVs.

The physical hardware components 402 may further include a microphone 412 and a loudspeaker 414, which may be used in combination to interact with nearby persons through speech. For example, the microphone 412 may capture speech and other sound from the environment of the UAV 102 and may analyze the sound the recognize speech of a nearby person. The loudspeaker 414 may be used to produce speech or other audio output directed to nearby persons.

In some cases, the UAV 102 may have a display panel 416 or other display mechanism for presenting a video interface to a nearby person. For example, as will be described below, the display panel 416 may be used to conduct a live videoconference between a customer at the delivery destination and a remote customer support representative.

The UAV 102 may utilize a processor 418 and associated memory 420. The processor 418 may comprise a general-purpose processor having a single core or multiple cores, a specialized processor, a digital signal processor, or multiple processors of the same or different types. The memory 420 may be a type of non-transitory computer storage media and may include volatile and nonvolatile memory. Thus, the memory 420 may include, but is not limited to, RAM, ROM, EEPROM, flash memory, or other memory technology.

The memory 420 may be used to store any number of software modules that are executable by the processor 418. The software modules comprise instructions that are executable by the processor 418 to implement the control logic components 404. Thus, the control logic components 404 may comprise software modules or components that are stored in the memory 420 and executed by the processor 418 to implement desired functionality of the UAV 102.

The control logic components 404 include a communication module or component 422 that utilizes the network interface and radio 410 to communicate with a control center and/or with other UAVs. The UAV 102 may communicate with a control center in order to receive instructions and route guidance. The UAV 102 may also communicate with the control center to report the current position of the UAV 102, to report delivery statuses, and so forth. In some cases, the UAV 102 may provide sensor data such as audio, video, and other data to the control center for analysis. The control center may alter certain aspects of the UAV's route or behavior depending on such an analysis. The UAV 102 may also receive audio and video from the control service for presentation to nearby persons.

Software elements of the UAV 102 may also include an object detection module 424 that utilizes various sensors of the sensor system 408 to detect objects that are near the UAV 102. Object detection may be used for avoidance, for example, in order to avoid collisions with other objects. Object detection may also be used to detect landmarks and/or to identify suitable landing areas.

Most relevant to the present discussion, the object detection module 424 may be configured to detect persons who are near the UAV 102. Depending on the implementation, the object detection module 411 may use different techniques to detect the presence of nearby persons. As one example, the object detection module 424 may analyze optical images produced by a camera of the UAV 102 to detect portions of the images that represent humans or human faces. As another example, the object detection module 424 may analyze three-dimensional depth maps of an area near the UAV 102 to detect shapes that correspond to humans. Alternatively, or in addition, the object detection module 424 may analyze or be responsive to infrared images or infrared sensor information to detect the locations of humans near the UAV 102. These and other techniques may be used in combination to detect nearby persons.

The UAV 102 may also include a flight and guidance component or module 426. The flight and guidance module 426 is responsive to various sensor information produced by the sensor system 408 to control the mechanical elements of the UAV 102, in order to maintain stable flight and to guide the UAV from a departure location to a delivery destination.

The UAV 102 may include a speech interface component or module 428 that utilizes the microphone 412 and the loudspeaker 414 to perform speech interactions with a person who is nearby the UAV 102. For example, the speech interface component or module 428 may issue a spoken warning when a person approaches the UAV 102, such as by generating the speech "Please stay back!" In some embodiments the speech interface component or module 428 may be used in conjunction with the display 416 to implement videoconferencing between a local user and a remote customer support representative.

Figure 5:
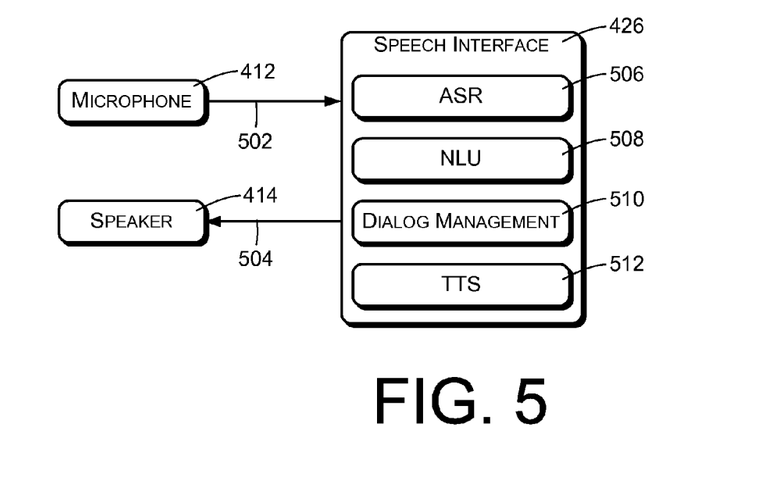
FIG. 5 is a block diagram showing logical components of a speech interface component.

FIG. 5 shows an example implementation of the speech interface component 428. Note that various embodiments may use different subsets and combinations of the components shown in FIG. 5. Also, note that parts of the described functionality may be implemented either by the UAV 102 or by a remote support service with which the UAV communicates.

The speech interface component 428 receives an input audio signal 502 produced using the microphone 412. The speech interface component 428 analyzes the input audio signal 502 to recognize input speech and to determine the meaning or intent of the input speech. Determining on the understanding of the input speech, the speech interface component 428 also generates an output audio signal 504, where the output audio signal 504 contains output speech that is to be produced by the loudspeaker 414 in response to the recognized input speech.

The speech interface component 428 has an automatic speech recognition (ASR) component 506 that recognizes human speech in the input audio signal 502. The ASR component 506 produces a continuous word stream corresponding to the speech represented by the input audio signal 502.

The ASR component 506 may use various techniques to create a full transcript of spoken words represented in an audio signal. For example, the ASR component 506 may reference various types of models, such as acoustic models and language models, to recognize words of speech that are represented in an audio signal. In many cases, models such as these are created by training, such as by sampling many different types of speech and by manual classification of the sampled speech.

In some implementations of speech recognition, an acoustic model represents speech as a series of vectors corresponding to features of an audio waveform over time. The features may correspond to frequency, pitch, amplitude, and time patterns. Statistical models such as Hidden Markov Models (HMMs) and Gaussian mixture models may be created based on large sets of training data. Models of received speech are then compared to models of the training data to find matches.

Language models describe things such as grammatical rules, common word usages and patterns, dictionary meanings, and so forth, to establish probabilities of word sequences and combinations. Analysis of speech using language models may be dependent on context, such as the words that come before or after any part of the speech that is currently being analyzed.

ASR may provide recognition candidates, which may comprise words, phrases, sentences, or other segments of speech. The candidates may be accompanied by statistical probabilities, each of which indicates a "confidence" in the accuracy of the corresponding candidate. Typically, the candidate with the highest confidence score is selected as the output of the speech recognition.

The speech interface component 428 may also have a natural language understanding (NLU) component 508 that determines the meaning or intent of user speech that is recognized by the ASR component 506.

The NLU component 508 analyzes a word stream provided by the ASR component 506 and produces a representation of a meaning of the word stream. For example, the NLU component 508 may use grammar rules and a parser to analyze a sentence and to produce a representation of a meaning of the sentence in a formally defined language that conveys concepts in a way that is easily processed by a computer. For example, the meaning may be semantically represented as a hierarchical set or frame of slots and slot values, where each slot corresponds to a semantically defined concept. Thus, the meaning of the sentence may be semantically represented by the frame of slots and slot values. NLU may also use statistical models and patterns generated from training data to leverage statistical dependencies between words in typical speech.

The speech interface component 428 may also have a dialog management component 510 configured to coordinate speech dialogs or interactions with a person near the UAV 102. Speech dialogs may be used to determine or clarify intents by asking a person for information using speech prompts. The speech interface component 428 may use scripts, rules, strategies, and/or state analyses to determine responses to meanings that are understood from speech utterances.

The speech interface component 428 may further include a text-to-speech (TTS) component 512 that synthesizes or otherwise produces speech audio under the control of the dialog management component 510. For example, the TTS component 512 may produce speech to be played on the loudspeaker 414.

Figure 6:
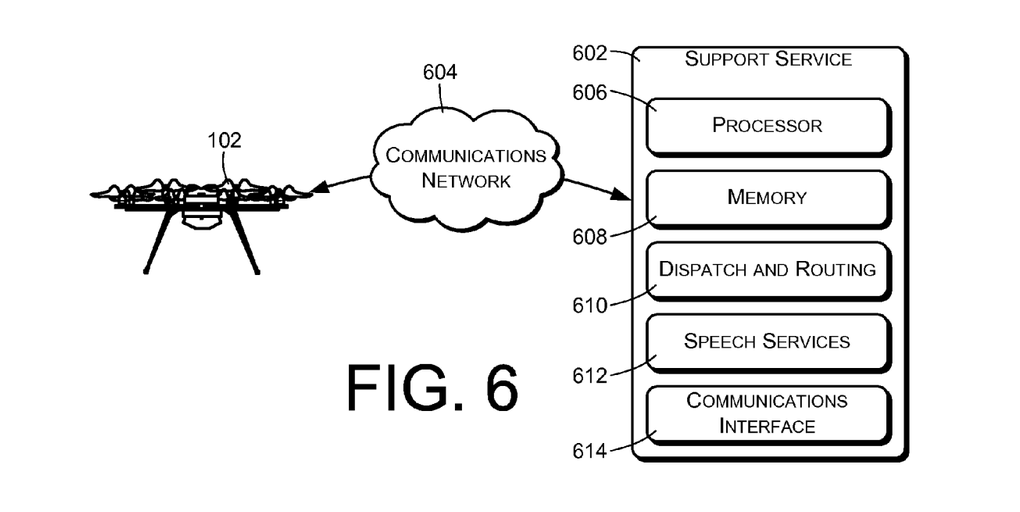
FIG. 6 is a block diagram showing logical components of a UAV support service.

FIG. 6 illustrates relevant components of a support service 602 that may be used as part of a control center to provide control services and other services to support the UAV 102. The support service 602 may comprise, for example, a networked computer or server to provide information and commands to a plurality of UAVs 102. Each UAV 102 may communicate with the support service 602 to report the current position of the UAV 102, to report delivery statuses, and so forth. In some cases, the UAV 102 may provide sensor data such as audio, video, and other data to the support service 602 for analysis. The support service 602 may alter certain aspects of the UAV's route or behavior depending on such an analysis. In addition, the support service 602 may provide support for the speech-related features of the UAV 102.

The support service 602 may communicate with multiple UAVs 102 via a communications network 604, which may utilize cellular, radio frequency (RF), Wi-Fi, or other suitable long-range wireless connection technologies. Portions of the communications network 604 may also utilize wired technologies and may include wide-area networks and public networks such as the Internet. Communications may be further implemented or extended using peer-to-peer communications between multiple UAVs 102.

The support service 602 may utilize a processor 606 and associated memory 608. The processor 606 may comprise a general-purpose processor having a single core or multiple cores, a specialized processor, a digital signal processor, or multiple processors of the same or different types. The memory 608 may be a type of non-transitory computer storage media and may include volatile and nonvolatile memory. Thus, the memory 608 may include, but is not limited to, RAM, ROM, EEPROM, flash memory, or other memory technology.

The memory 608 may be used to store any number of software modules that are executable by the processor 606. The software modules comprise instructions that are executable by the processor 606 to implement software components that are stored in the memory 608 and executed by the processor 606.

Software components of the support service 602 may include a dispatch and routing module 610 that communicates with the UAV 102 over the communications network 604 to specify delivery destinations and routing information as well as to provide other information in order to supervise the activities of the UAV 102.

Software components of the support service 602 may also include a speech services module 612, which may provide some of the speech interface components described above with reference to FIG. 5, or which may provide support for such components. In some embodiments, the UAV 102 may provide the input audio signal 502 to the speech services module 612 by streaming the input audio signal 502 over the communications network 604. Similarly, the speech services module 612 may stream the output audio signal 504 over the communications network 604 to the UAV 102.

The support service 602 has a network communications interface 614 for communicating over the communications network 604 with multiple UAVs 102. The communications interface 614 may utilize wired and/or wireless technologies, depending on the nature of the communications network 604.

FIGS. 7-11 illustrate different ways of using the speech capabilities of the UAV 102. The order in which the operations are described is not intended to be construed as a limitation, and the operations or actions described in the different figures may be combined in various ways.

Figure 7:
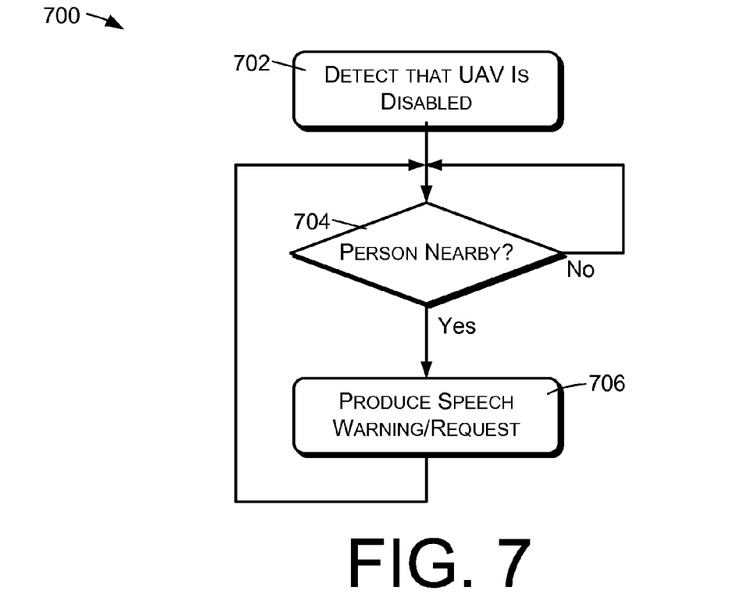
FIGS. 7-12 are flow diagrams showing different scenarios for using speech interaction by a UAV.

FIG. 7 illustrates an example method 700 that may be performed when the UAV 102 has become broken or otherwise disabled. For example, the UAV 102 may be unable to fly or navigate and may be resting at a ground location. In some cases the UAV 102 may be in a hazardous state, such as may be the case when the propellers of the UAV 102 are rotating or when the UAV is unable to reliably determine whether the propellers are rotating. In other cases the UAV 102 may be grounded at a location and unable to communicate its location to a control center.

An action 702 comprises detecting that the UAV 102 is disabled. An action 704 comprises detecting the presence of a bystander using one or more sensors of the sensor system 408. The action 704 may comprise capturing optical images of an area surrounding the UAV 102 and performing image analysis to detect human faces in the images. In other cases, the action 704 may comprise capturing audio and analyzing the audio to detect human voices. Various other types of analyses may be used to detect nearby humans. The action 704 may include detecting whether a person is within an unsafe distance of the UAV 102.

If a person is not detected near the UAV 102, the action 702 repeats. If a person is detected in the vicinity of the UAV 102 or within an unsafe distance of the UAV 102, such as within 20 feet of the UAV 102, for example, an action 706 is performed of producing output speech using the loudspeaker 414. The output speech may instruct or query the person. For example, the output speech may comprise a request or warning for the nearby person to stay away or move away from the UAV 102. In some cases, the speech may comprise a request the person to perform an action such as reporting the location of the UAV 102, moving the UAV 102 to a safe location, retrieving the UAV 102 and delivering it to a control center or operations base, taking the UAV 102 to a charging location, etc.

After producing the speech in the action 704, the action 702 may be repeated. Thus, the spoken warning or request may be repeated as long as a person is within the predefined distance of the UAV 102.

Figure 8:
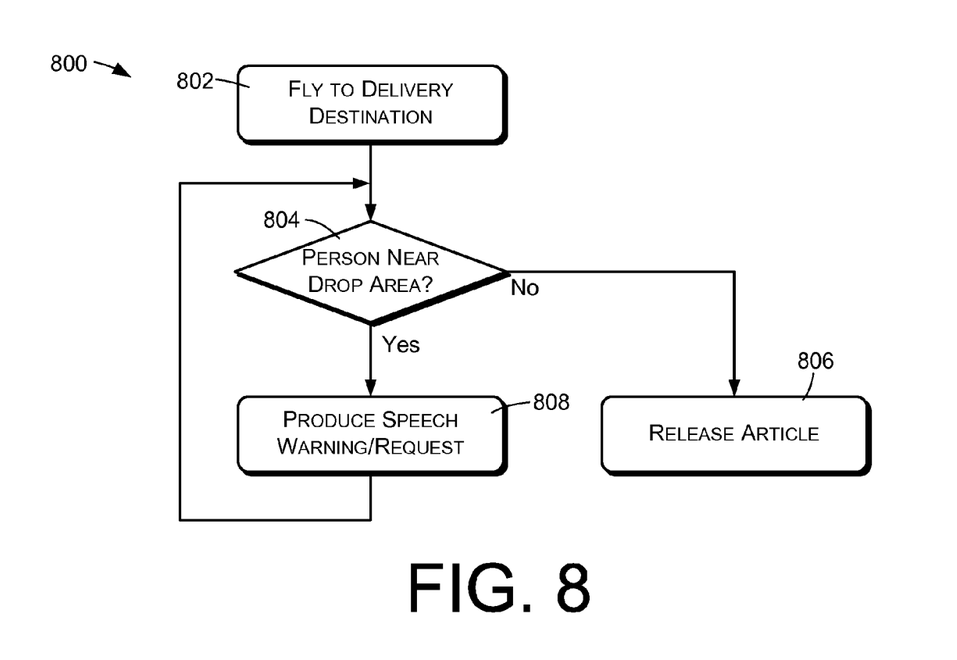

FIG. 8 illustrates another example method 800 that may be performed when the UAV 102 delivers an article to a delivery destination. An action 802 comprises flying and carrying an article from a product distribution location to a delivery destination. An action 804, performed while still airborne at the delivery destination, comprises detecting a person at the delivery destination using one or more sensors of the sensor system 408. The action 804 may include determining whether the person is within an unsafe distance of an article drop site at the delivery destination, such that the UAV 102 is unable to land or approach the article drop site without endangering the nearby person. For example, the action 804 may comprise determining whether the person is within a predetermined distance of the drop site.

If a person is not detected near the article drop site, an action 806 is performed, comprising descending to the article drop site and/or releasing the article at the article drop site. If a person is at or near the article drop site, an action 808 is performed of producing output speech using the loudspeaker 414. The output speech may instruct or query the person. For example, the output speech may comprise a request or warning for the nearby person to stay away or move away from the article drop site.

After producing the speech in the action 808, the action 804 may be repeated. Thus, the spoken warning or request may be repeated as long as a person is near the article drop site. The article is released at the article drop site when UAV determines that the person has moved to a safe distance from the article drop site.

Figure 9:
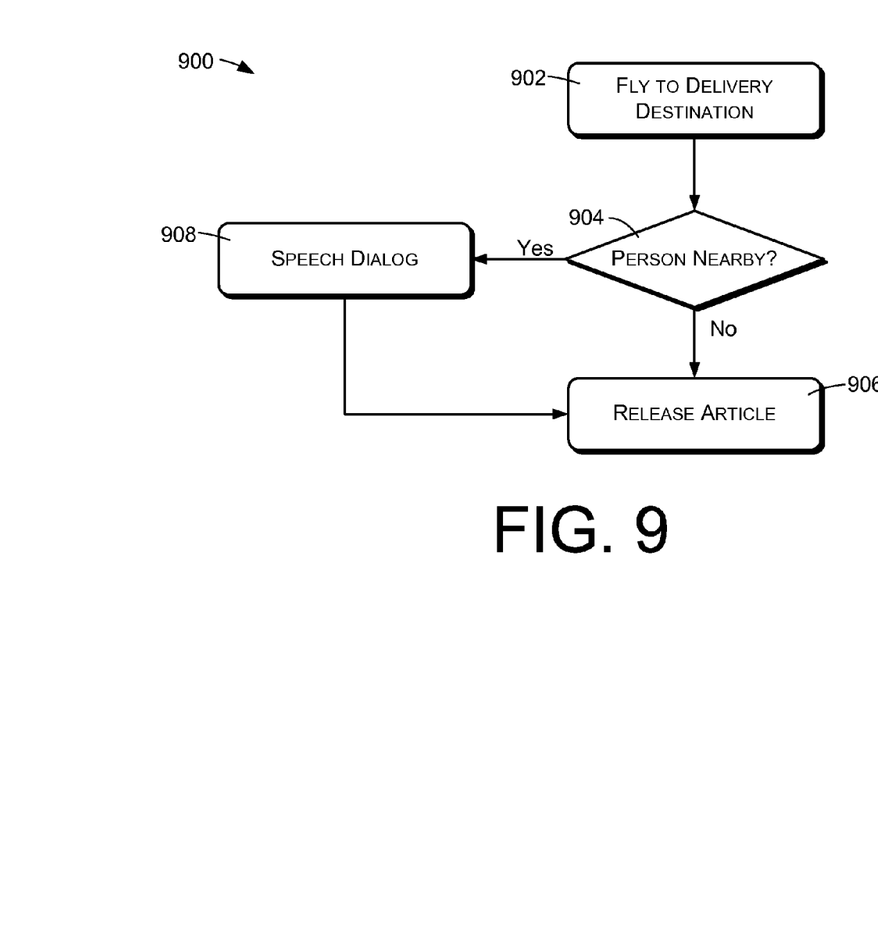

FIG. 9 illustrates another example method 900 that may be performed when the UAV 102 delivers an article to a delivery destination. This example assumes that the UAV 102 has both speech output and speech input capabilities.

An action 902 comprises flying and carrying a product or other article from a product distribution location to a delivery destination. An action 904, performed while still airborne at the delivery destination, comprises detecting a person at the delivery destination using one or more sensors of the sensor system 408.

If a person is not detected near the UAV 102, an action 906 is performed, comprising descending to the article drop site and/or releasing the article at the article drop site. If a person is at or near the article drop site, an action 908 is performed of engaging in a two-directional speech dialog with the nearby person. A speech dialog may comprise one or more dialog turns, where each dialog turn comprises speech of the nearby person and speech produced by the UAV 102.

The speech dialog may relate to various topics, and may be initiated by either the UAV 102 or the nearby person. For example, the person may notice the UAV 102 and may ask a question such as "What is in this delivery?" The UAV 102 may respond by providing an answer to the question, such as by describing the article that is being delivered. As another example, the UAV 102 may request information from the person such as the name of the person, whether the proposed drop site is acceptable to the person, etc. As another example, the UAV 102 may request that the person indicate a desirable drop site.

In response to the spoken request by the UAV 102, the person may respond by speech with the requested information. The UAV 102 may capture the speech using the microphone 412. The UAV 102 may recognize and interpret the meaning of the speech, and may save the provided information or provide the information to the control center. As an example, the UAV 102 may determine or identify a desired drop site based on the meaning of the person's responsive speech. After interacting with the user through the speech dialog, the UAV 102 may descend to the article drop site and release the article at the article drop site.

In cases where the person provides information regarding a desired article drop site, the UAV 102 may proceed to the newly specified drop site and perform the action 906 of releasing the article at the drop site. For example, the person may state "Take the delivery to the back door," and the UAV 102 may respond by flying to an area by the back door of the user's residence and releasing the article there.

The speech dialog may also request that the person move away from the article drop site. In some cases, the action 906 may be delayed until the person has moved away from the article drop site.

Figure 10:
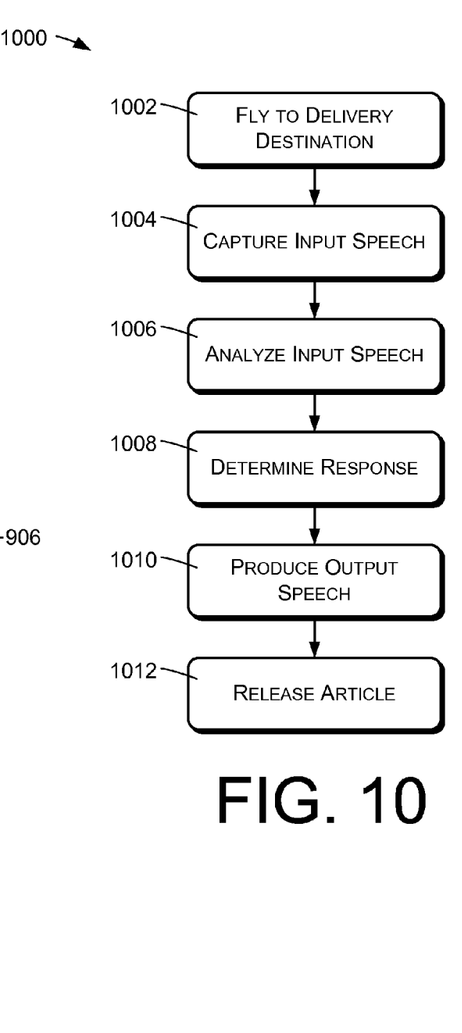

FIG. 10 illustrates a method 1000 that may be used when delivering an article to a delivery destination. An action 1002 comprises flying and carrying an article from a product distribution location to a delivery location. An action 1004 comprises, while airborne, capturing input speech of a person at the delivery destination using the microphone 412. In some cases, the input speech may comprise a question. In other cases, the input speech may comprise an answer to an inquiry previously presented to the person by the UAV 102. In some cases, the input speech may comprise an inquiry regarding any one of various topics, including information regarding the article being delivered, information regarding other existing orders, information regarding new orders, etc.

An action 1006 comprises analyzing the input speech or causing the input speech to be analyzed to understand a meaning of the input speech. This may include performing ASR to determine the words of the input speech. This may also include performing NLU to determine a meaning or intent of the input speech.

An action 1008 comprises determining an appropriate response to the input speech. An action 1010 comprises producing output speech using the loudspeaker 414, wherein the output speech is responsive to the meaning of the input speech. In cases where the input speech is an inquiry, the output speech may comprise an answer to the inquiry.

In some cases, the actions 1006 and 1008 may be performed by the UAV 102 itself. In other cases, the actions 1006 and 1008 may be performed at least in part by a supporting service. In cases such as this, the UAV 102 causes input speech to be analyzed by transmitting the input speech or an audio signal representing the input speech to a support service to determine the meaning of the input speech. The support service may perform the action 1008 of determining the appropriate response to the input speech and may provide the output speech to the UAV 102.

In some embodiments, the action 1006 of analyzing the input speech may comprise performing voice recognition to determine or verify the identity of the nearby person. Voice recognition may be performed to verify that the person is an authorized recipient of the article, for example. Similarly, face detection and recognition may be used to determine or verify the identity of the person and that the person is an authorized recipient of the article.

An action 1012 comprises releasing the article at the article drop zone.

Figure 11:
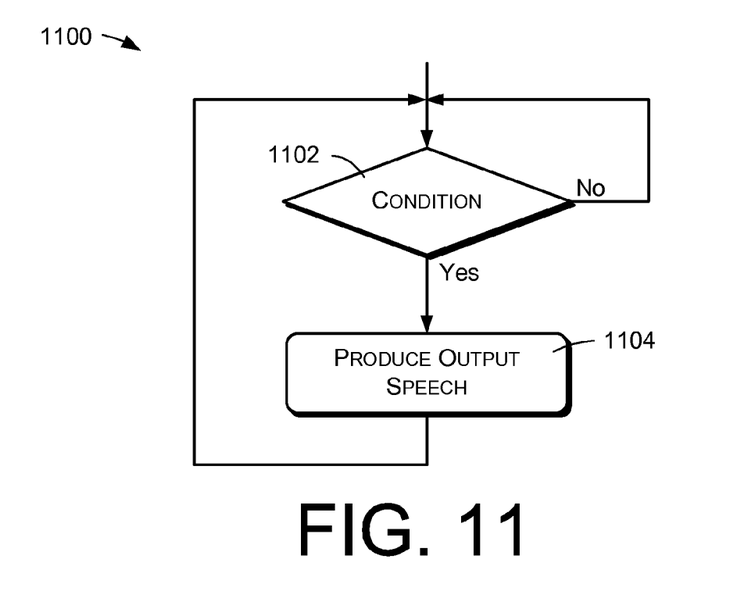

FIG. 11 illustrates another example method 1100 that may be performed using the UAV 102. An action 1102 comprises detecting a condition that can be addressed by speech. As an example, the condition might be that a person is in the vicinity of the UAV 102. As another example, the condition may be that the UAV 102 is ready to land or take off. As yet another example, the condition may be that the UAV 102 is lost, disabled, or is presenting a potential hazard.

In response to detecting the condition, an action 1104 comprises producing output speech using the loudspeaker 414 of the UAV 102. The output speech may, for example, warn any nearby persons of a hazardous or dangerous situation. As another example, the output speech may request bystanders or people near a drop site to move away.

Figure 12:
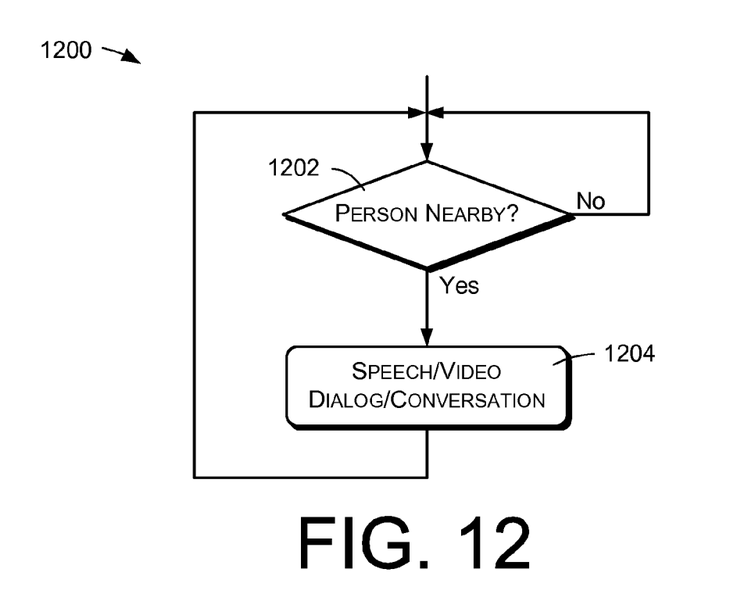

FIG. 12 illustrates another example method 1200 that may be performed using the UAV 102. An action 1202 comprises detecting a person who is near the UAV 102. An action 1204 comprises, in response to detecting the person, conducting a dialog with the person. In embodiments such as those described above, the dialog may be an audio dialog that is performed using automated components such as ASR, NLU, dialog management, and speech generation. In other embodiments, the dialog may be implemented by connecting the person to a live customer service representative using bi-directional audio and/or video. For example, the UAV 102 may capture audio and video signals and transmit them to a control center or service center for presentation in real time to a customer service representative. Similarly, audio and video of the customer service representative may be transmitted to and received by the UAV 102 in real time. This allows the person and the service representative to conduct a real-time conversation, during which the representative may address any issues raised by the person. In cases where the dialog includes video, video of the service representative may be presented on the display 416 of the UAV 102.

In some cases, the action 1204 may initially comprise conducting an automated audio dialog. In response to certain conditions, such as an inability to understand the nearby person or a specific request by the person to talk with a live representative, the automated dialog may be transitioned to a live audio conference or a live audio-video conference.

Although the subject matter has been described in language specific to certain features, it is to be understood that the subject matter defined in the appended claims is not necessarily limited to the specific features described. Rather, the specific features are disclosed as illustrative forms of implementing the claims.

What is claimed is:

1. An unmanned aerial vehicle (UAV) comprising:
    an article support configured to carry an article to a delivery destination;
    one or more sensors configured to detect an interactive object;
    a loudspeaker configured to produce audio output;
    one or more processors;
    one or more non-transitory computer-readable media storing computer-executable instructions that, when executed on the one or more processors, cause the UAV to perform actions comprising:
        detecting the interactive object at the delivery destination using the one or more sensors;
        determining whether the interactive object is within an unsafe distance of an article drop site at the delivery destination based on the detection;
        when it is determined that the interactive object is within an unsafe distance from the article drop site, producing a first output speech using the loudspeaker, wherein the first output speech requests that the interactive object move away from the article drop site;
        when it is determined that the interactive object is outside the unsafe distance from the article drop site, descending to the article drop site to deliver the article.

2. The UAV of claim 1, the actions further comprising:
    detecting that the UAV is disabled at a ground location; and
    producing second output speech using the loudspeaker, wherein the second output speech requests an interactive object to report that the UAV is disabled at a ground location.

3. The UAV of claim 1, further comprising:
    a microphone configured to capture speech of the interactive object, wherein the captured speech comprises a question; and
    the actions further comprising producing second output speech using the loudspeaker, wherein the second output speech comprises an answer to the question.

4. The UAV of claim 1, further comprising:
    a microphone configured to capture speech of the interactive object; and
    the actions further comprising conducting a speech dialog with the interactive object, wherein the speech dialog comprises one or more dialog turns, each dialog turn comprising speech of the interactive object and second output speech produced using the loudspeaker.

5. A method, comprising:
    carrying an article to a delivery destination with an unmanned aerial vehicle (UAV);
    detecting an interactive object in an article drop site at the delivery destination using one or more sensors on the UAV;
    determining, by the UAV, whether the interactive object is within a predetermined distance from the article drop site based on the detection;
    when it is determined that the interactive object is within the predetermined distance from the article drop site, producing, by the UAV, a first output speech using a loudspeaker, wherein the first output speech requests that the interactive object move away from the article drop site;
    capturing input speech of the interactive object at the delivery destination using a microphone of the UAV;
    analyzing the input speech; and
    producing second output speech using a loudspeaker of the UAV, wherein the output speech is responsive to the analyzed input speech;
    and when it is determined that the interactive object is outside of the predetermined distance from the article drop site, descending, by the UAV, to the article drop site to deliver the article.

6. The method of claim 5, wherein analyzing the input speech comprises transmitting the captured input speech to a support service and receiving the responsive output speech from the support service.

7. The method of claim 5, wherein analyzing the input speech comprises performing speech recognition on an audio signal produced using the microphone of the UAV.

8. The method of claim 5, wherein analyzing the input speech comprises:
 performing speech recognition on an audio signal produced using the microphone of the UAV to determine words of the input speech; and
 performing natural language understanding on the words of the input speech.

9. The method of claim 5, further comprising transmitting the input speech to a customer service representative, wherein the second output speech comprises speech of the customer service representative.

10. The method of claim 5, further comprising:
 initiating a speech dialog with the interactive object in response to detecting the interactive object at the delivery destination.

11. The method of claim 5, further comprising determining the article drop site based at least in part on the analyzed input speech.

12. The method of claim 5, further comprising performing voice recognition to determine whether the interactive object is an authorized recipient of the article.

13. The method of claim 5, further comprising performing face recognition to determine whether the interactive object is an authorized recipient of the article.

14. The method of claim 5, wherein the input speech comprises an inquiry regarding the article and the second output speech comprises an answer to the inquiry.

15. An unmanned aerial vehicle (UAV) comprising:
 an article support configured to carry an article for delivery to a delivery destination;
 a loudspeaker configured to produce audio output;
 one or more processors;
 one or more non-transitory computer-readable media storing computer-executable instructions that, when executed on the one or more processors, cause the UAV to perform actions comprising:
  detecting an interactive object proximate to an article drop site at the delivery destination;
  determining whether the interactive object is within a predetermined distance of the article drop site at the delivery destination based on the detection;
  when it is determined that the interactive object is within the predetermined distance from the article drop site, producing output speech using the loudspeaker; and
  when it is determined that the interactive object is outside of the predetermined distance from the article drop site, descending to the article drop site to deliver the article.

16. The UAV of claim 15, further comprising:
 detecting that the UAV is ready to land or takeoff.

17. The UAV of claim 15, further comprising:
 one or more sensors configured to detect the interactive object.

18. The UAV of claim 15,
 wherein the output speech requests that the interactive object move away from the article drop site.

19. The UAV of claim 15, wherein the output speech warns the interactive object to stay at a safe distance from the UAV.

20. The UAV of claim 15, wherein the output speech asks the interactive object to report a location of the UAV.

* * * * *